(12) United States Patent
Goldman et al.

(10) Patent No.: US 7,212,494 B1
(45) Date of Patent: May 1, 2007

(54) IN-BAND MUST-SERVE INDICATION FROM SCHEDULER TO SWITCH FABRIC

(75) Inventors: Gary Goldman, Los Altos, CA (US); Nitin Garg, San Jose, CA (US); Man Yip, Sunnyvale, CA (US); Phong Bui, San Jose, CA (US); Kent Wendorf, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 654 days.

(21) Appl. No.: 09/846,157

(22) Filed: Apr. 30, 2001

(51) Int. Cl.
*H04L 12/56* (2006.01)
(52) U.S. Cl. .................... 370/235; 370/395.43
(58) Field of Classification Search ............. 370/230.1, 370/231, 232, 235, 352, 384, 391, 392, 395.1, 370/395.21, 395.4, 395.41, 395.42, 395.43
See application file for complete search history.

(56) References Cited

U.S. PATENT DOCUMENTS 6,304,552 B1 * 10/2001 Chapman et al. ........... 370/232
6,438,134 B1 * 8/2002 Chow et al. ................. 370/412
6,680,933 B1 * 1/2004 Cheesman et al. .......... 370/352
6,975,630 B1 * 12/2005 Kusumoto ............. 370/395.41
2001/0051992 A1 * 12/2001 Yang et al. ................. 709/207

* cited by examiner

Primary Examiner—Chi Pham
Assistant Examiner—Anh-Vu Ly
(74) Attorney, Agent, or Firm—Blakely, Sokoloff, Taylor & Zafman LLP

(57) ABSTRACT

A method and system for the fair allocation of unused guaranteed bandwidth. Data segments of at least one class of service are received at each of a plurality of ingress line cards. Each class of service has a guaranteed percentage of transmission bandwidth. The system uses a must-serve bit to mark a number of data cells within each class of service. The number of cells marked depends on the guaranteed bandwidth percentage for the particular class of service. The mark is referred to as "must-serve" since the scheduler must serve the particular class of service to the extent of the marked cells in order to meet the guaranteed bandwidth. The generic switch fabric monitors the cells and the switch CPU reallocates bandwidth so that only the marked cells are provided preferential transmission. Non-marked cells compete equally for excess bandwidth.

24 Claims, 4 Drawing Sheets

IN-BAND MUST-SERVE INDICATION FROM SCHEDULER TO SWITCH FABRIC

FIELD OF THE INVENTION

The present invention relates generally to connection oriented telecommunications networks, and more specifically to ensuring the fair allocation of excess bandwidth among non-guaranteed transmission with a service class.

BACKGROUND

Connection oriented communications networks typically contain switches that receive incoming data in the form of Asynchronous Transfer Mode (ATM) cells or other traffic types (e.g., frame relay packets) that can be converted to ATM cells. A switch can be can be structured with a set of ingress line cards (ILCs) that receive data from a number of virtual connections (VCs) and convert it to a single internal format. Typically an ILC may service a million VCs. The switch also includes generic switching fabric to channel the incoming data to one or more of a set of egress line cards (ELCs) that send the data out through the network. The generic switching fabric links the ILCs and the ELCs. When a packet arrives at the ingress port it can be switched to any of the egress ports depending upon the data in the packet. The line card data ports may have different transmission bandwidths (e.g., Optical Carrier 192 (OC-192) having a speed of 10 gigabits per second (gbs)). A problem arises when the data from one or more ILCs is channeled to an ELC that lacks the capacity to output the data.

FIG. 1A depicts a block diagram of switch 100 having ILCs 101, 102, and 103, generic switching fabric 104, and ELCs 105, 106, and 107. The data from line cards 101, 102, and 103, each having an OC-192 transmission line with a bandwidth of 10 gbs, is being channeled to ELC 105 at capacity (i.e., each ILC is transmitting 10 gbs). Because ELC also has an OC-192 transmission line it can only output a third of the data. To handle this situation a quality of service (QoS) scheme is implemented in the switch. When there is data congestion within the switch the QoS determines the order in which line card data is sent.

The QoS implements a guaranteed bandwidth structure (GBS) to guarantee a particular ingress port a certain percentage of the transmission bandwidth of a particular egress port. FIG. 1B depicts a switch 120 providing guaranteed bandwidth. As shown in FIG. 1B, ILC 101 of switch 120 is guaranteed 30% of the transmission bandwidth of ELC 105, ILC 102 is guaranteed 50%, while ILC 103 is guaranteed 0%. This means, for example, that during congested flow no less than 30% of the transmission bandwidth of ELC 105 will be available for the data channeled from ILC 101. If ILC 101 does not require the bandwidth it will be allocated on a non-guaranteed basis. The allocations are modified whenever a connection is initiated.

If ELC 105 becomes congested the switch will maintain its guarantee to ILC 101 and ILC 102. For example, if ILC 101, ILC 102, and ILC 103 transmit at 30%, 50% and 20% of the bandwidth of ELC 105, respectively, then all the data is transmitted. If, however, ILC 101, ILC 102, and ILC 103 each transmit at 100% of the bandwidth of ELC 105, then data congestion appears at ELC 105. Switch fabric 104 then channels only the guaranteed data (i.e., 30% from ILC 101 and 50% from ILC 102). When the congestion is dissipated, switch fabric 104 resumes unrestricted channeling.

The incoming data to the ILCs may also be categorized by class of service (CoS). Each class of service may have a guaranteed bandwidth within the guarantee of the ILC. Typically, the ILC connections may be differentiated into 128 classes of service. FIG. 1C depicts a switch 140 having classes of service A, B, and C within each of ILCs 101, 102, and 103. Classes may be selected by a user based on the type of data transmitted. For example, a constant bit rate (CBR) may be desired for voice communication. A variable bit rate (VBR) or unspecified bit rate (UBR) may suffice for other data types. The classes of service are used to determine transmission priority. The class of service designations and bandwidth guarantees are used to determine the network subscription cost.

As shown in FIG. 1C the class A data of ILC 101 is guaranteed 20% of the transmission bandwidth of ELC 105, class B data of ILC 101 is guaranteed 10%, and class C data has no guarantee. The transmission bandwidth of ELC 105 that is guaranteed to ILC 102 is similarly allocated to the classes of service. No bandwidth is guaranteed to any of the classes of ILC 103.

Generic switch fabric does not recognize the classes within the GBS. So, if class A data of ILC 101 is guaranteed 20%, class B data of ILC 101 is guaranteed 10%, and class C data of ILC has no guarantee, when only class C data is being transmitted through ILC 101 it will receive a 30% guarantee. In other words the generic switch fabric gives the guaranteed bandwidth to any classes of service from a particular line card without regard to the guarantee for the particular class. This leads to non-guaranteed data being treated unequally. For example if ILCs 101, 102, and 103 each transmit only class C data (i.e., no class A or B data) at 100% of the bandwidth of ELC 105, congestion will appear at ELC 105 and the generic switch fabric 104 will only channel the guaranteed data as described above. The transmission rate will drop to the total guaranteed rate until the congestion clears. However, the generic switch fabric 104 channels the data based on the total guarantee of all classes of service from each ILC, not the guarantee of the particular class of service being transmitted. Therefore, ILC 101 will be able to transmit class C data at 30% of the bandwidth of ELC 105, even though ILC 101 has a 0% guarantee for class C data. ILC 102 will be able to transmit class C data at 50% of the bandwidth of ELC 105, even though ILC 102 has a 15% guarantee for class C data. ILC 103 will not be able to transmit any class C data until the congestion dissipates. This system does not provide a fair allocation of the unused guaranteed bandwidth.

SUMMARY

A method and system is described for receiving data segments of at least one class of service at each of a plurality of ingress line cards. Each class of service has a guaranteed percentage of transmission bandwidth. A portion of the data segments of each class of service are marked based on the guaranteed percentage of bandwidth of that class of service. If data transmitted from a class of service exceeds the guaranteed percentage of transmission bandwidth of that class of service, the number of data segments marked corresponds to the guaranteed percentage of transmission bandwidth of that class of service. If data transmitted from a class of service is less than the guaranteed percentage of transmission bandwidth of the class of service, all the data segments of the class are marked.

The marked data segments from each class of service are transmitted preferentially such that non-marked data segments from any ingress line card compete equally for non-allocated transmission bandwidth.

Other features and advantages of the present invention will be apparent from the accompanying drawings, and from the detailed description, which follows below.

BRIEF DESCRIPTION OF THE DRAWINGS

The present invention is illustrated by way of example and not limited by the figures of the accompanying drawings in which like references indicate similar elements and in which.

DETAILED DESCRIPTION

A method and system for the fair allocation of unused guaranteed bandwidth is disclosed. The system uses a must-serve bit to mark a number of data cells within each class of service. The number of cells marked depends on the guaranteed bandwidth percentage for the particular class of service. The mark is referred to as "must-serve" since the scheduler must serve the particular class of service to the extent of the marked cells in order to meet the guaranteed bandwidth. The generic switch fabric monitors the cells and the switch CPU reallocates bandwidth so that only the marked cells are provided preferential transmission. Non-marked cells compete equally for excess bandwidth. An intended advantage of one embodiment of the present invention is guaranteed service rates for all classes of service. Another intended advantage of one embodiment of the present invention is to allow for fair allocation of unused guaranteed bandwidth.

Figure 1A:
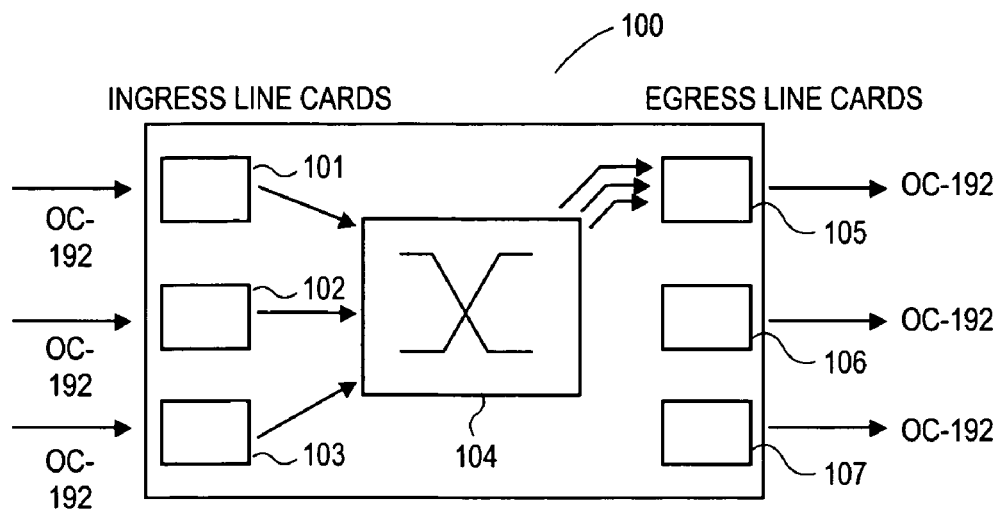
FIGS. 1A, 1B and 1C depict a block diagram of a switch card according to the prior art.
Figure 1B:
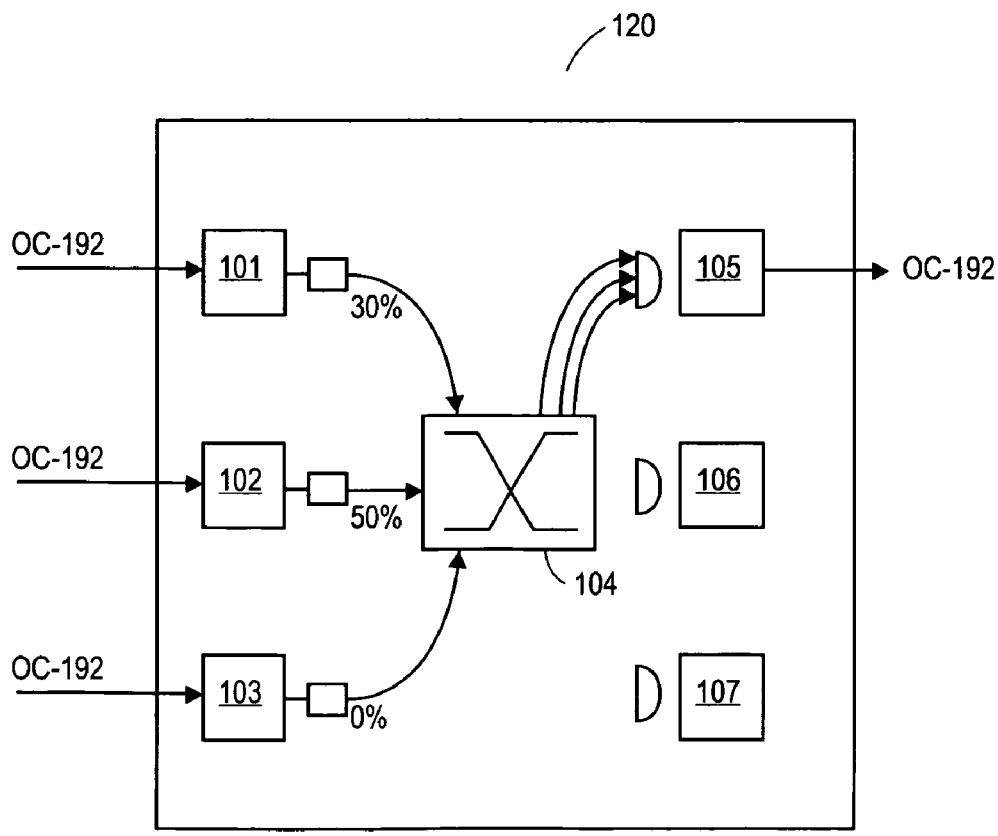
Figure 1C:
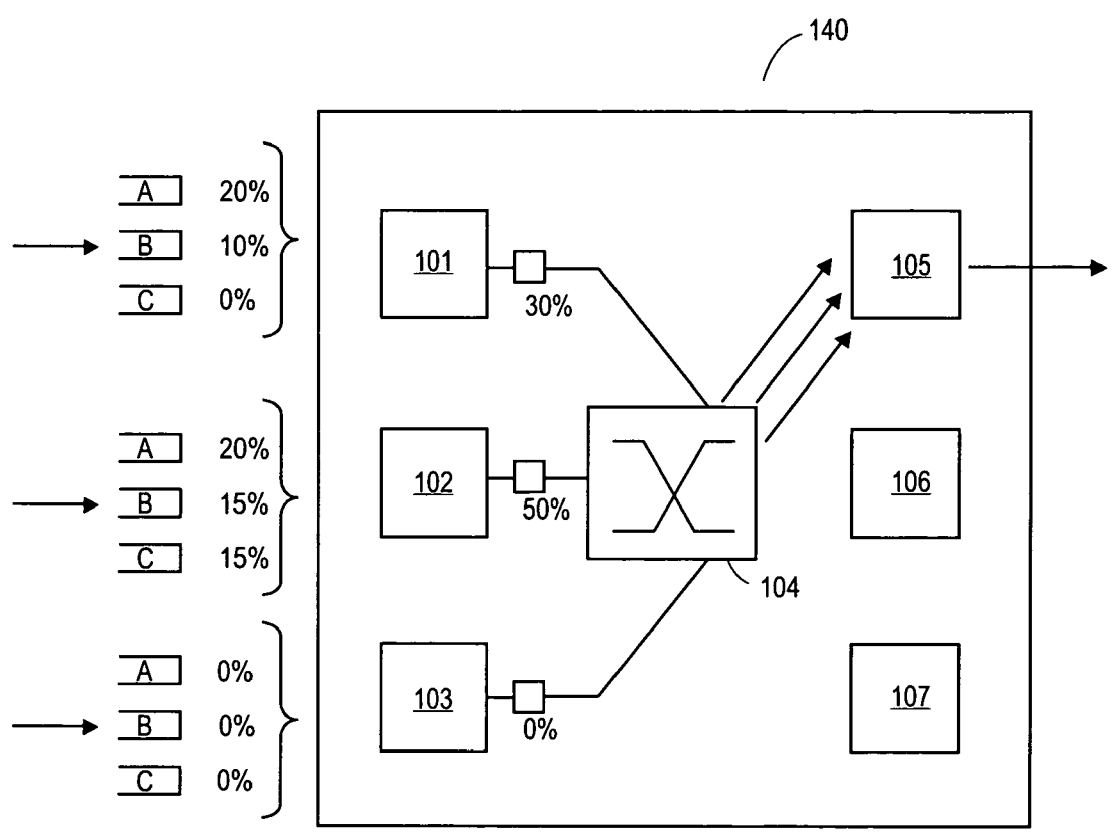
Figure 2:
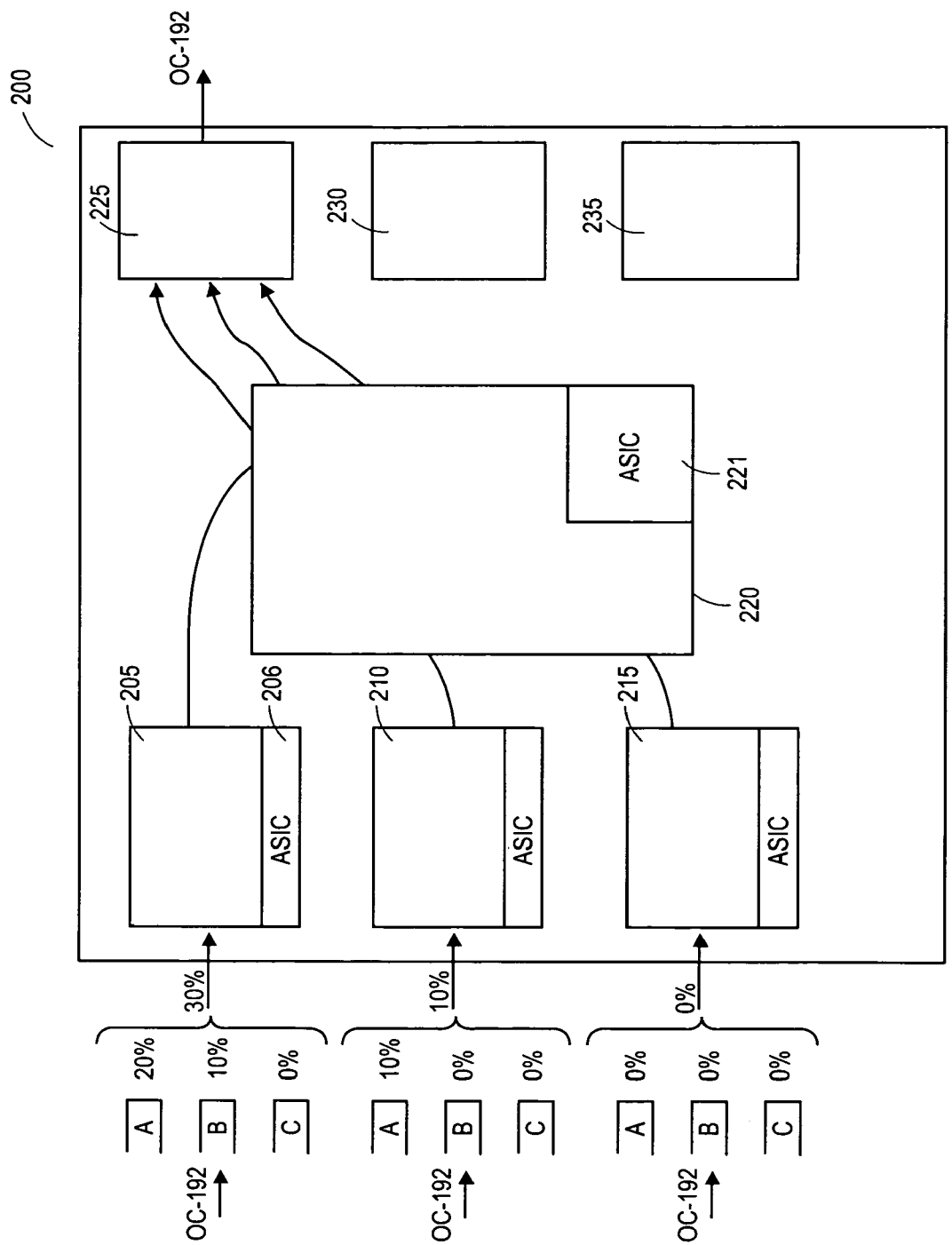
FIG. 2 depicts a block diagram of a switch according to one embodiment of the present invention.

FIG. 2 shows a switch according to one embodiment of the present invention. The switch 200, shown in FIG. 2 contains ILCs 205, 210, and 215. Each ILC has classes of data A, B, and C. Incoming data to each ILC is placed in a buffer. The ILC ASIC shown in FIG. 2 as ASIC 206 then determines which cells are transmitted and in which order for ILC 205. This is done by marking the cells from each class of service according to their guaranteed bandwidth. For example, if class A data of ILC 205 which is guaranteed 20% is incoming at 100% of the transmission rate, then 20% of the cells will be marked as must serve cells. If, for example, the data is incoming at 20% of the transmission rate then all of the cells will be marked as must serve cells. ASIC 206 is programmed with the guaranteed bandwidth percentage for all the classes of service of ILC 205. In one embodiment a must-serve bit is implemented on each cell that must be transmitted for the scheduler to meet the guarantee to that class of service. If the ILC ASIC determines that the cell must be transmitted in order to meet the class of service guarantee then the must-serve bit is sent in-band with the cell to the switch fabric. If the cell is being transmitted simply to utilize excess bandwidth then it is not marked.

The cells are transmitted to switch fabric 220 that includes ASIC 221 that directs the cells to the proper egress port (e.g., ELCs 225, 230, or 235). ASIC 221 monitors the cells to ensure that the class of service bandwidth guarantees are met. The switch fabric can modify its service based on the state of the must serve bit of a cell or on the aggregate of the bits over time.

For example, 100% transmission capacity of an OC-192 is being transmitted as follows. Class A data of ILC 205 (guarantee 20%) is transmitting 30% and class A data of ILC 215 (guarantee 0%) is transmitting 70%. No data is being transmitted through ILC 210. Suppose, due to switch competition, only 70% total capacity can be transmitted. Of the 30% coming from ILC 205, 20% are marked (i.e., ⅔ of the cells are marked) with a must serve bit. The switch fabric 220 is attempting to guarantee ELC 205 30% transmission bandwidth. Because only ⅔ of the cells are marked, the switch fabric ASIC 221 monitoring the data stream determines that the 30% guarantee is not being used (i.e., that to some extent the guarantee is being used by a non-guaranteed class of service data). The additional 10% of transmission bandwidth is excess and should be shared fairly among all non-guaranteed classes. The switch central processing unit (CPU), not shown, will then reallocate the bandwidth through any of several mechanisms known to those skilled in the art.

A class data of ILC 205 is guaranteed 20%, 20% of the cells have a must-serve marking, therefore 20% of the available 70% will be guaranteed. This leaves 50% available that will be allocated based on free competition between the non-guaranteed data. The 70% being transmitted through class A of ILC 215 having no guarantee competes freely with the 10% non-guaranteed class A data of ILC 205 for the remaining 50% of transmission bandwidth.

As discussed above when data congestion appears the switch shuts down the non-guaranteed traffic and channels only the guaranteed traffic. An embodiment of the current invention ensures that a guarantee is applied fairly between classes of service.

For example, if class B data from ILC 205 is transmitted at 100% capacity, the switch fabric ASIC 221 monitors the number of cells that are marked (in this case 10%). If, at the same time, class B data from ILC 215 is transmitted at 100% capacity, congestion will appear at ELC 225. An adjustment to the transmission rate as described above is made (i.e., only guaranteed data is transmitted until the congestion clears). In accordance with the present invention however, ILC 205 will have a guarantee of only 10% (the amount of the data actually being transmitted that is guaranteed). Therefore, only 10% of the class B data from ILC 205 will be transmitted during congestion.

Figure 3:
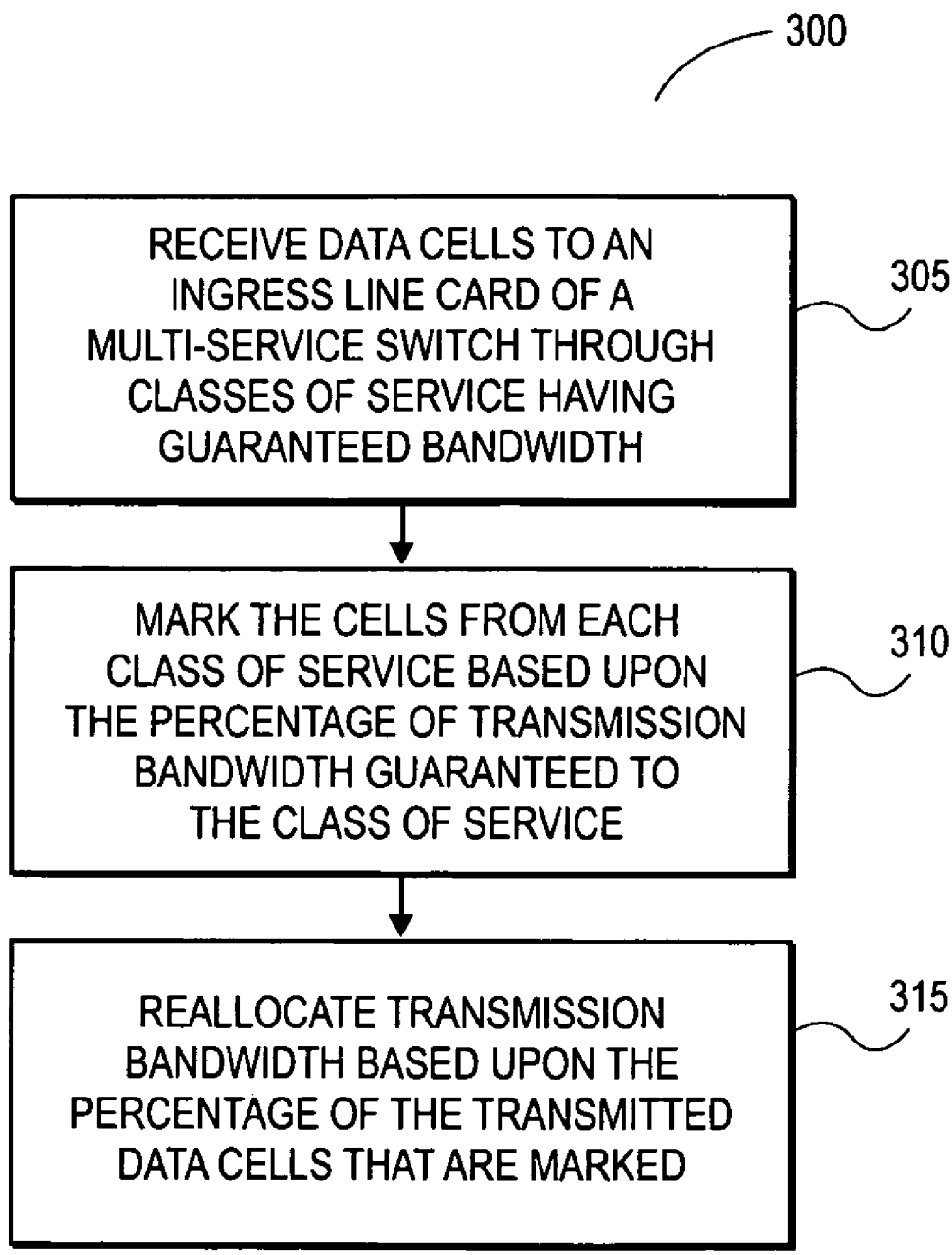
FIG. 3 is a process flow diagram in accordance with one embodiment of the present invention.

FIG. 3 is a process flow diagram in accordance with one embodiment of the present invention. Process 300, shown in FIG. 3, begins at operation 305 in which data cells are received by an ILC through several classes of service.

In operation 310 the scheduler determines when a cell from a particular class of service must be transmitted in order to meet the guarantee to the class of service. The must-serve bit is then sent in-band with the cell to the switch fabric, which can modify its service based on the state of this bit or on the aggregate of the bits over time (inferred rate).

In operation 315 the transmission bandwidth is reallocated based upon the amount of the data transmission that is guaranteed. The marked cells are monitored by the switch fabric ASIC (i.e., ASIC 221) which tracks how much of the guaranteed bandwidth is used. By monitoring this information, the switch fabric can dynamically determine the guaranteed bandwidth requirements from each ILC. The amount of transmission bandwidth guaranteed is determined for each ILC by the total percentage of marked data cells transmitted from the ILC. The switch CPU uses the statistical information from the switch fabric ASIC to reallocate bandwidth so that guaranteed classes receive the bandwidth necessary to meet their guarantee while excess bandwidth is distributed fairly by the switch fabric among the remaining incident traffic.

In one embodiment the marking and monitoring of the cells is implemented on an ASIC, as described above, and the bandwidth reallocation is implemented by a switch CPU. In an alternative embodiment the marking and monitoring of cells as well as the bandwidth reallocation may be implemented on a general purpose computer using computer software containing executable instructions on a machine-readable medium.

In the foregoing specification the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative rather a restrictive sense.

We claim:

1. A method comprising:
    receiving data segments of at least one class of service at each of a plurality of ingress line cards, each class of service having an associated guaranteed percentage of transmission bandwidth;
    marking a portion of the data segments of each class of service corresponding to the associated guaranteed percentage of the transmission bandwidth of the class of service if data transmitted from a class of service exceeds the associated guaranteed percentage of the transmission bandwidth of the class of service, wherein a portion is less than all of the data segments;
    marking all of the data segments of each class of service if data transmitted from a class of service is less than the associated guaranteed percentage of the transmission bandwidth of the class of service; and
    preferentially transmitting the marked data segments from each class of service.

2. The method of claim 1, further comprising:
    transmitting unmarked data segments from each class of service equally.

3. The method of claim 1, wherein the data segments are asynchronous transfer mode cells.

4. The method of claim 1, wherein the data segments are data types selected from a group consisting of frame relay packet, voice transmission data, internet protocol packet, and circuit emulation service packet.

5. The method of claim 3, wherein marking includes implementing a must-serve bit on the cells.

6. The method of claim 2, wherein preferentially transmitting the marked data segments includes guaranteeing that the marked data segments are transmitted prior to transmitting the unmarked segments.

7. An apparatus comprising:
    means for receiving data segments of at least one class of service at each of a plurality of ingress line cards, each class of service having an associated guaranteed percentage of transmission bandwidth;
    means for marking a portion of the data segments of each class of service corresponding to the associated guaranteed percentage of the transmission bandwidth of the class of service if data transmitted from a class of service exceeds the associated guaranteed percentage of the transmission bandwidth of the class of service, wherein a portion is less than all of the data segments;
    means for marking all of the data segments of each class of service if data transmitted from a class of service is less than the associated guaranteed percentage of the transmission bandwidth of the class of service; and
    means for preferentially transmitting the marked data segments from each class of service.

8. The apparatus of claim 7, further comprising:
    means for transmitting unmarked data segments from each class of service equally.

9. The apparatus of claim 7, wherein the data segments are asynchronous transfer mode cells.

10. The apparatus of claim 7, wherein the data segments are data types selected from a group consisting of frame relay packet, voice transmission data, internet protocol packet, and circuit emulation service packet.

11. The apparatus of claim 9, wherein marking includes implementing a must-serve bit on the cells.

12. The apparatus of claim 9, wherein preferentially transmitting the marked data segments includes guaranteeing that the marked data segments are transmitted prior to transmitting the unmarked segments.

13. A computer-readable medium encoded with executable instructions, which when executed by a computer, cause said computer to perform a method, the method comprising:
    receiving data segments of at least one class of service at each of a plurality of ingress line cards, each class of service having an associated guaranteed percentage of transmission bandwidth;
    marking a portion of the data segments of each class of service corresponding to the associated guaranteed percentage of the transmission bandwidth of the class of service if data transmitted from a class of service exceeds the associated guaranteed percentage of the transmission bandwidth of the class of service, wherein a portion is less than all of the data segments;
    marking all of the data segments of each class of service if data transmitted from a class of service is less than the associated guaranteed percentage of the transmission bandwidth of the class of service; and
    preferentially transmitting the marked data segments from each class of service.

14. The computer-readable medium of claim 13, wherein the method further comprises:
    transmitting unmarked data segments from each class of service equally.

15. The computer-readable medium of claim 13, wherein the data segments are asynchronous transfer mode cells.

16. The computer-readable medium of claim 13, wherein the data segments are data types selected from a group consisting of frame relay packet, voice transmission data, internet protocol packet, and circuit emulation service packet.

17. The computer-readable medium of claim 15, wherein marking includes implementing a must-serve bit on the cells.

18. The computer-readable medium of claim 14, wherein preferentially transmitting the marked data segments includes guaranteeing that the marked data segments are transmitted prior to transmitting the unmarked segments.

19. An apparatus comprising:
    a receiving device to receive data segments of at least one class of service at each of a plurality of ingress line cards, each class of service having an associated guaranteed percentage of transmission bandwidth;
    a marking device to mark a portion of the data segments of each class of service corresponding to the associated guaranteed percentage of the transmission bandwidth of the class of service if data transmitted from a class of service exceeds the associated guaranteed percentage of the transmission bandwidth of the class of service, wherein a portion is less than all of the data segments;

said marking device to mark all of the data segments of each class of service if data transmitted from a class of service is less than the associated guaranteed percentage of the transmission bandwidth of the class of service; and a transmitting device to preferentially transmit the marked data segments from each class of service.

20. The apparatus of claim 19, wherein the transmitting device transmitting unmarked data segments from each class of service equally.

21. The apparatus of claim 19, wherein the data segments are asynchronous transfer mode cells.

22. The apparatus of claim 19, wherein the data segments are data types selected from a group consisting of frame relay packet, voice transmission data, internet protocol packet, and circuit emulation service packet.

23. The apparatus of claim 21, wherein marking includes implementing a must-serve bit on the cells.

24. The apparatus of claim 21, wherein preferentially transmitting the marked data segments includes guaranteeing that the marked data segments are transmitted prior to transmitting the unmarked segments.

* * * * *